Nov. 2, 1937.    J. E. TORBERT, JR    2,097,849
ADJUSTABLE LEVEL
Original Filed Sept. 16, 1935
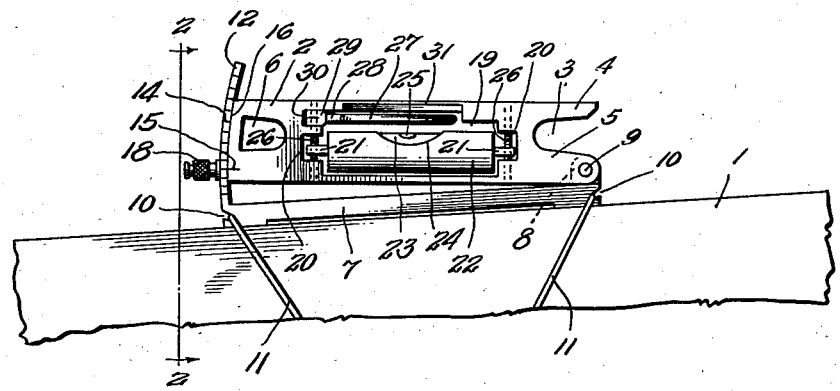
Inventor
J. E. Torbert, Jr.

Patented Nov. 2, 1937

2,097,849

UNITED STATES PATENT OFFICE 2,097,849

ADJUSTABLE LEVEL

John E. Torbert, Jr., National City, Calif.

Original application September 16, 1935, Serial No. 40,833. Divided and this application December 11, 1936, Serial No. 115,437

1 Claim. (Cl. 33—213)

This invention relates to levels and one object of the invention is to provide a level which may be detachably secured to a straight edge bar and the straight edge bar then applied to leveling lugs of the fuselage or wings of an airplane and the level adjusted in order to ascertain the angular relation of the fuselage or the wings of the airplane to a true horizontal plane. This application constitutes a division from the co-pending application for a patent upon an improved testing and setting device for artificial horizon instruments filed September 16, 1935, Serial No. 40,833, but it is to be understood that, while the improved adjustable level is particularly adapted for use in connection with a straight edge bar to be applied to the leveling lugs of an airplane, it is not restricted to such use and may be used either in connection with a straight edge bar or applied directly to any object when it is desired to ascertain the angular relation of the object or a surface thereof to a true horizontal plane.

Another object of the invention is to so construct the level that it may be easily tilted about a pin connecting it with a supporting bar over which the body portion of the level is disposed and also to provide improved means for securely but releasably holding the level in a set position.

Another object of the invention is to provide the supporting bar with an arcuate arm through which a fastener passes to releasably hold the level in an adjusted position, the arcuate arm being provided with scale markings in order that the angle at which the level has been set may be determined.

The invention is illustrated in the accompanying drawing, wherein

Figure 1 is a view showing the improved level in side elevation and applied to a straight edge bar, a portion of which has been shown, and Figure 2 is a view taken along the line 2—2 of Figure 1 with the improved level shown in end elevation and the straight edge bar in section.

This improved level has been shown applied to an edge face of a straight edge bar 1 which may be of any length desired, but it is to be understood that the level may be used either with a straight edge bar which is to be disposed in contacting and bridging engagement with leveling lugs of an airplane or the level may be directly applied to an object in order to determine the angular relation of a surface thereof to a true horizontal plane. The body portion 2 of the level is formed of strong metal and has one end portion recessed, as shown at 3, to provide arms 4 and 5 and its other end portion formed with an opening 6 constituting a finger-hold, by means of which the body portion of the level may be readily grasped and the body portion swung toward or away from a base bar 7. This base bar extends longitudinally of the body and at one end is formed with a hinge ear 8 with which the outer or free end of the arm 5 is pivotally connected by a pivot pin 9. Notches 10 are formed at ends of the bar to receive yokes 11, by means of which the level is held in engagement with the edge face of the straight edge bar. The yokes preferably form a portion of securing means, such as shown in the co-pending application referred to above, but it is to be understood that any desired securing means may be employed or the level may be used independently of the bar 1 and set in place upon the surface which it is desired to test and ascertain the angular relation thereof to a true horizontal plane. An arm 12 which is curved longitudinally, as shown in Figure 1, extends upwardly from the base bar at the opposite end thereof from the hinge ear 8, and it should be noted that this arm is formed with a longitudinally extending slot 13, as shown in Figure 2, and that each side edge face is provided with scale markings, as shown at 14 in Figure 1. The arm 12 constitutes a segment of a circle having the pivot pin 9 as its center and the scale markings 14 constitute degrees of the circle. An indicating mark 15 is provided upon each side face of the body or plate 2 to cooperate with the scale markings of the arcuate arm and thus permit the angular relation of the surface being tested to a true horizontal plane to be readily ascertained. Referring to Figure 1, it will be seen that the edge face 16 of the body or plate 2 which bears against the inner face of the arm 12 is arcuate to conform to the curvature of the arm and has close contacting face to face engagement with the inner face of the arm at all times. A threaded stem 17 extends from the free end of the body or plate 2 and this stem extends through the slot 13 and carries a securing sleeve or nut 18 which is threaded upon the stem so that, when it is tightened by turning it in one direction, it will have binding engagement with the outer face of the arm and securely but releasably hold the body or plate in an adjusted position.

An opening 19 extends longitudinally of the plate or body 2 between the openings 6 and the inner end of the recess 3 and is formed with recesses 20 at its ends to receive the lugs 21 at ends of a cylindrical casing 22 in which a bubble glass 23 is housed, a sight opening 24 being provided midway the length of the casing 22 in order that the bubble 25 may be seen. Stems 26 which are threaded are carried by the body 2 with portions extending through the recesses 20 and threaded through the ears or lugs 21, and it will be readily apparent that by turning the stems the casing 22 and the bubble glass housed therein may be tilted longitudinally and thus set to dispose the bubble exactly midway the length of the bubble glass and the sight opening when initially setting the level. It is desired to permit the bubble to be observed when using the level for overhead work, and in order to do so, there has been provided a mirror 27 having a shank 28 provided with a swiveled mounting member or bearing 29 at its end which fits loosely about one of the stems 26 within a recess 30 formed at one end of the opening 19. By so mounting the mirror it may be swung into and out of position between the bubble glass and the bar 31 of the body 2 and, when the mirror is in this position, it may be tilted from the position shown in full lines in Figures 1 and 2 to either of the diagonally extending positions indicated by dotted lines in Figure 2. It will thus be seen that a person using the level for overhead work may swing the mirror into position between the bubble glass and the bar 31 and then tilt the mirror transversely to such a position that the reflection of the bubble may be easily seen. When the level is used in such a position that the operator looks down upon the level, the mirror may be swung to one side where it will be out of the way and not interfere with a clear view of the bubble glass.

When this level is in use, it may be secured upon an edge face of a straight edge bar which is to be applied in bridging relation to leveling lugs of an airplane or the level may be used without the straight edge bar and set in place directly upon a surface to be tested. The operator looks at the bubble glass and if the bubble is not centered in the sight opening the securing sleeve or nut 18 is loosened and the body 2 tilted about its pivot 9 until the bubble is centered at which time the securing nut or sleeve will be again tightened and the body will be securely held in the set position. The level may then be transferred to another object which it is desired to have extend at the same angle as the one just tested and the second object or surface brought into the proper angle to cause the bubble to be exactly centered in the sight opening and the two objects or surfaces will extend at the same angle with respect to a true horizontal plane.

Having thus described the invention, what is claimed as new is:

A level comprising a body, an indicator carried by said body, a bar extending longitudinally of said body under the same and at one end pivoted to the body whereby the body may be tilted upwardly to angularly adjusted positions relative to the bar, an arcuate arm carried by and projecting upwardly from the other end of the bar along the edge face of the free end of the body and formed with a longitudinally extending slot confronting the edge face of the free end of the body, the said free end of the body having an arcuate edge face conforming to the curvature of the arm and having flat contacting engagement with the inner side face of said arm, a stem projecting from the arcuate edge face of the free end of said body through the slot of said arm, and a fastener threaded upon said stem for gripping the arm when tightened and releasably securing the body in an angularly adjusted position.

JOHN E. TORBERT, Jr.